United States Patent [19]
Blaney et al.

[11] Patent Number: 5,834,385
[45] Date of Patent: Nov. 10, 1998

[54] OIL-SORBING ARTICLE AND METHODS FOR MAKING AND USING SAME

[75] Inventors: Carol Ann Blaney, Roswell; Henry Louis Griesbach, III, Atlanta, both of Ga.

[73] Assignee: Kimberly-Clark Worldwide, Inc., Neenah, Wis.

[21] Appl. No.: 628,765

[22] Filed: Apr. 5, 1996

[51] Int. Cl.[6] .................................................. B32B 3/30

[52] U.S. Cl. ..................... 442/382; 442/385; 442/413; 442/414

[58] Field of Search .................................. 442/382, 385, 442/413, 414

[56] References Cited

U.S. PATENT DOCUMENTS

| | | | |
|---|---|---|---|
| 810,137 | 1/1906 | Green . | |
| 3,545,442 | 12/1970 | Wicker | 128/296 |
| 3,916,447 | 11/1975 | Thompson | 2/46 |
| 4,042,740 | 8/1977 | Krueger | 428/138 |
| 4,103,058 | 7/1978 | Humlicek | 428/171 |
| 4,342,807 | 8/1982 | Rasen et al. | 428/180 |
| 4,375,446 | 3/1983 | Fujii et al. | 264/518 |
| 4,424,248 | 1/1984 | Tesch et al. | 428/172 |
| 4,663,220 | 5/1987 | Wisneski et al. | 428/221 |
| 4,741,941 | 5/1988 | Englebert et al. | 428/71 |
| 4,798,754 | 1/1989 | Tomek | 428/74 |
| 4,885,204 | 12/1989 | Bither | 428/284 |
| 4,929,480 | 5/1990 | Midkiff et al. | 428/35.6 |
| 4,980,215 | 12/1990 | Schonbrun | 428/72 |
| 5,055,332 | 10/1991 | Rhodes et al. | 428/74 |
| 5,176,930 | 1/1993 | Kannankeril et al. | 426/124 |
| 5,186,831 | 2/1993 | DePetris | 210/242.4 |
| 5,262,218 | 11/1993 | Putzier | 428/74 |
| 5,296,290 | 3/1994 | Brassington | 428/300 |
| 5,320,895 | 6/1994 | Larsonneur et al. | 428/137 |
| 5,350,624 | 9/1994 | Georger et al. | 428/219 |
| 5,391,415 | 2/1995 | Bair | 428/74 |
| 5,434,339 | 7/1995 | LaMotte | 588/258 |
| 5,549,945 | 8/1996 | Lind | 428/35.5 |

FOREIGN PATENT DOCUMENTS

| | | | |
|---|---|---|---|
| 644248 | 3/1995 | European Pat. Off. | C09K 3/32 |

OTHER PUBLICATIONS

Patent Abstracts of Japan, vol. 95, No. 7 & JP 07 108170 A (Suzuki Sogyo), 25 Apr. 1995.
Patent Abstracts of Japan, vol. 95, No. 11 & JP 07 204505 A (Daiichi Eizai), 8 Aug. 1995.
Patent Abstracts of Japan, vol. 95, No. 7 & JP 07 100376 A (Mitsui Toatsu), 18 Apr. 1995.
PCT International Search Report mailed 5 Aug. 1997.

*Primary Examiner*—Jenna Davis
*Attorney, Agent, or Firm*—J. E. Ruland

[57] ABSTRACT

An absorbent article for use in cleaning oil spills comprises a first exposed outer layer of hydrophobic, liquid-permeable, fibrous polymeric nonwoven web and an absorbent body, adjacent the outer layer, comprising oil absorbent, cellulose-based material. Desirably, the article further comprises a second exposed outer layer of hydrophobic polymeric material with the absorbent body disposed between the first and second exposed outer layers. The absorbent article is placed on a layer of oil resting on the surface of a body of water for oil spill clean up. The absorbent article selectively absorbs oil over water because the outer hydrophobic layer repels water but attracts oil and transfers the oil to the oil absorbent body encased between the exposed outer layers. This invention results in considerable savings in cost and in non-renewable resources because the bulk of the product is a cellulose-based material, which is renewable, while only a small portion is polymeric nonwoven, which is non-renewable.

36 Claims, 5 Drawing Sheets

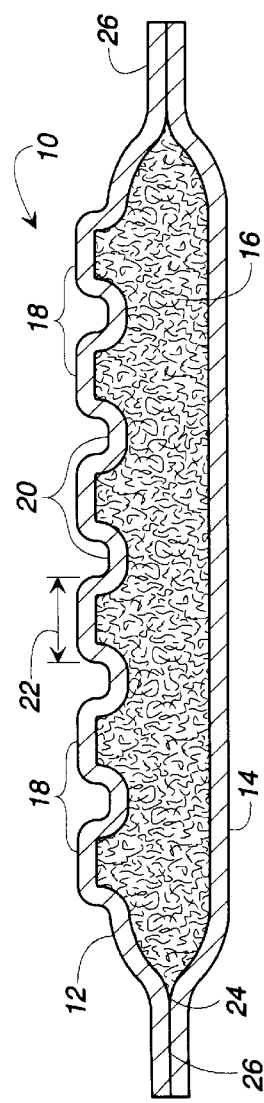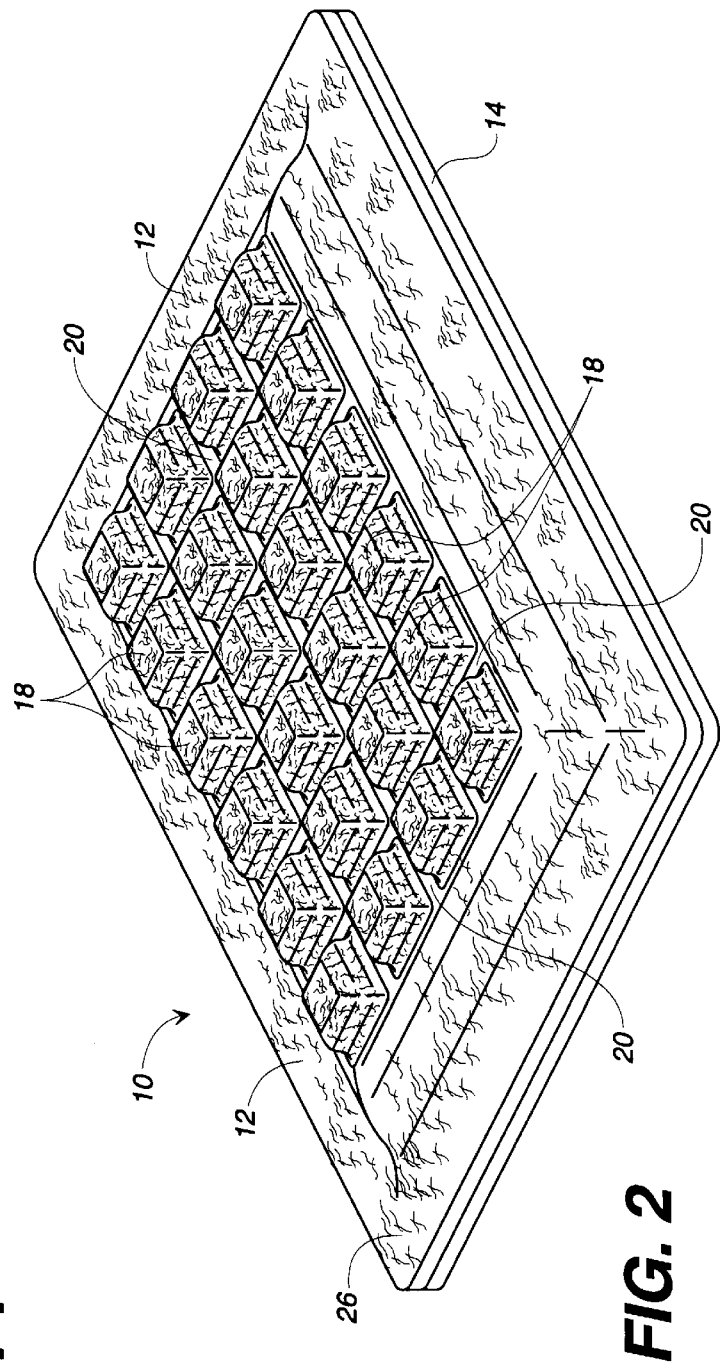

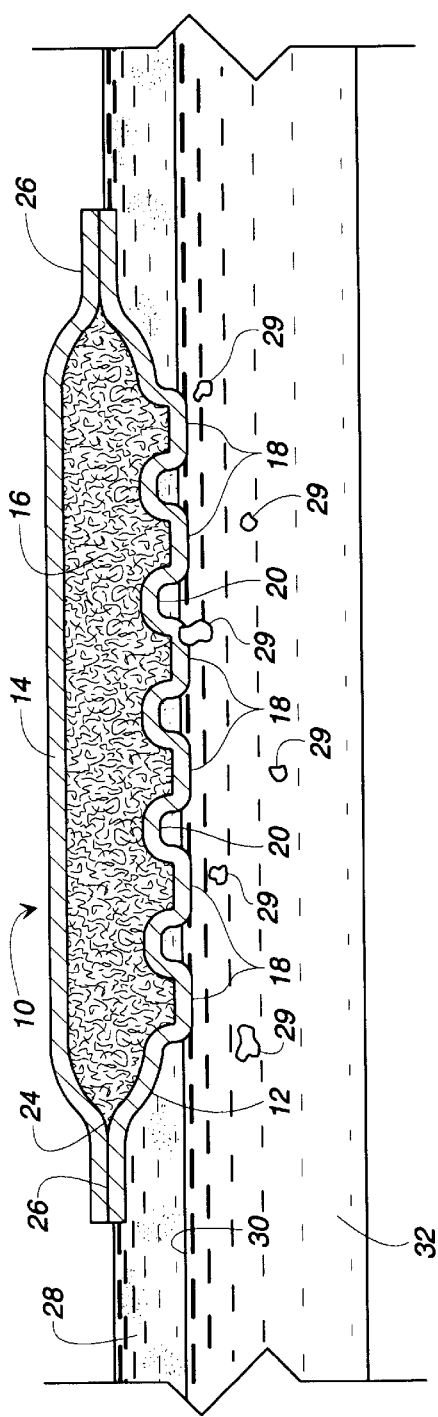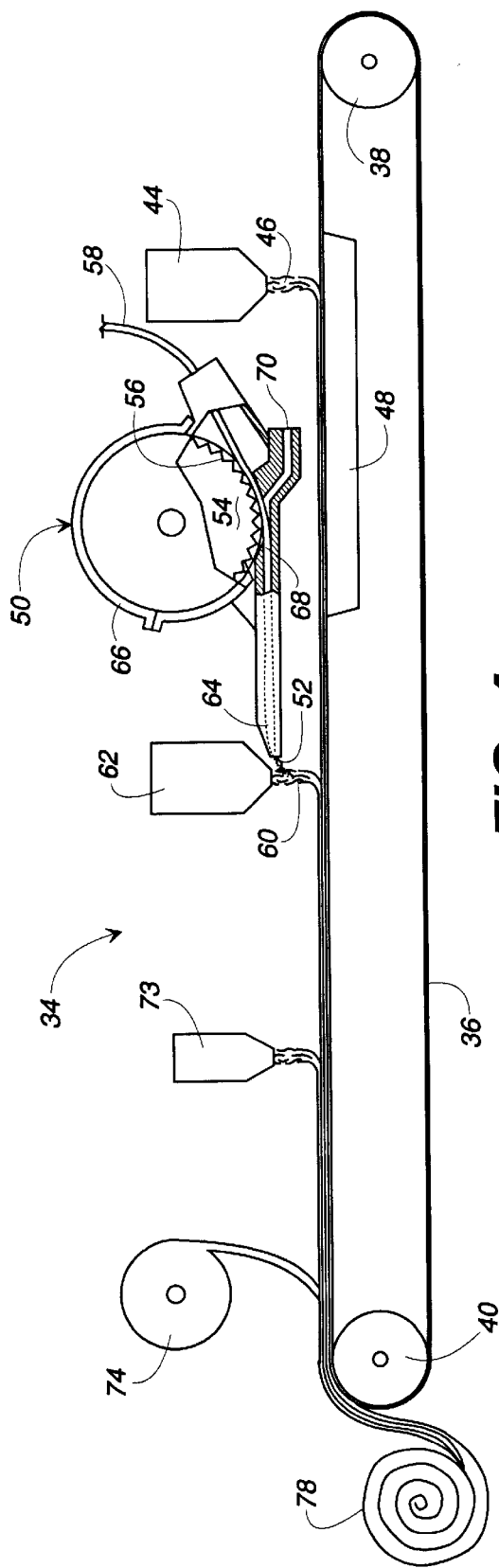

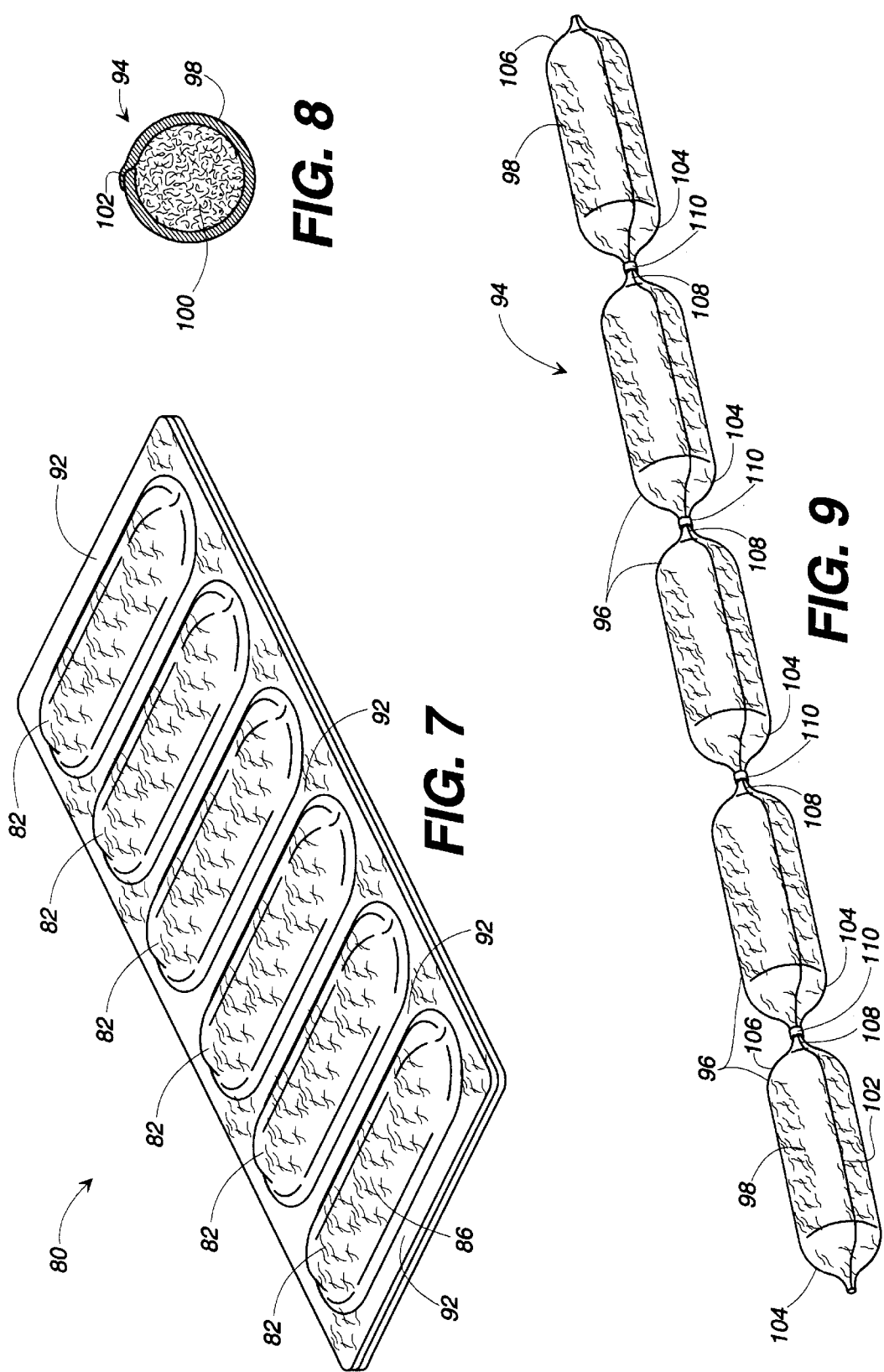

OIL-SORBING ARTICLE AND METHODS FOR MAKING AND USING SAME

TECHNICAL FIELD

This invention generally relates to nonwoven polymeric materials and more particularly relates to oil-sorbing articles including nonwoven polymeric materials for use in oil spill clean up.

BACKGROUND OF THE INVENTION

The benefits of oil spill clean up are well documented, but oil spill clean up is a very difficult and costly task. One method of cleaning an oil spill on a body of water is to absorb the oil into an oil absorptive material such as a cellulose-based material or a fibrous polymeric nonwoven material. The absorptive material is placed on the layer of oil formed by the oil spill and, when the absorptive material is saturated, the absorptive material is picked up and disposed of, or pressed to remove the oil and then reused or burned.

Cellulose-based materials such as wood pulp fibers are relatively inexpensive. Oil spills can be relatively large and require an enormous amount of absorbent material for clean up. Thus, the low cost of wood pulp-based material makes them desirable. However, cellulose-based materials are hydrophilic and attractive to oil, or oil-philic, and therefore absorb both oil and water readily. Accordingly, when cellulose-based material is used to clean an oil spill, it tends to absorb both oil and water and thus a significant portion of the cellulose-based material becomes saturated with water or other aqueous solutions such as saline. This inhibits oil spill clean up.

Fibrous polymeric nonwoven webs are often naturally hydrophobic and attractive to oil. For example, polyolefin nonwoven webs are hydrophobic and oil-philic. Therefore, polymeric nonwoven webs are desirable for use in oil spill clean up but are relatively expensive.

Thus, there is a need for a relatively low cost, absorptive article which selectively absorbs oil over water and is useful in oil spill clean up.

SUMMARY OF THE INVENTION

This invention solves the above-described problems by providing an absorptive article comprising a first exposed outer layer of hydrophobic, liquidpermeable, fibrous polymeric nonwoven web and an absorbent body, adjacent the outer layer, comprising oil absorbent, cellulose-based material. The absorbent article of the present invention selectively absorbs oil over water because of the hydrophobic nature of the first exposed outer layer. Being hydrophobic, the first exposed outer layer of the absorptive article repels water but functions as a transport layer to direct oil to the adjacent absorbent body which retains the oil. The absorbent article of the present invention is relatively inexpensive because the bulk of the absorbent article is the absorbent body which comprises relatively inexpensive cellulose-based material and the more expensive polymeric nonwoven web forms only the outer layer of the absorbent article. Furthermore, the absorbent article of the present invention results in considerable savings in non-renewable resources because the cellulose based material is renewable whereas the polymeric nonwoven material is not.

Desirably, the absorbent article further comprises a second exposed outer layer of hydrophobic polymeric material. The cellulose-based absorbent body is disposed between the first and second exposed outer layers. The second exposed outer layer can be a hydrophobic, liquid-permeable, fibrous polymeric nonwoven web or a polymeric film.

More particularly, the polymer from which the first and second exposed outer layers of the absorbent article are made has a surface energy at 20° C. within the range of about 20 dynes/cm$^2$ and 50 dynes/cm$^2$. Within this range, the first and second outer layers are hydrophobic and oil-philic. Desirably, the first exposed outer layer is a meltblown or spunbond web and has an array of discrete surface features such as apertures or projections extending outerwardly from the first exposed outer layer and away from the absorbent body. The surface features increase the surface area of the first exposed outer layer and increase the rate of absorption of oil through the first exposed outer layer.

The absorbent body comprises cellulose-based material. The absorbent body may further comprise polymeric strands along with the cellulose-based material forming a nonwoven web. Such an absorbent body can be made by co-forming the absorbent body with polymeric meltblown fibers and cellulose-based materials, such as wood pulp fibers.

This invention also encompasses a method for cleaning an oil spill on a body of water having a surface wherein the layer of oil rests on the surface of the body of the water. The method includes the steps of placing on the layer of oil an absorbent article of the present invention so that the first exposed outer layer contacts the oil and faces toward the body of water, and thereafter, removing the absorbent article from the body of water. The used absorbent article can then be discarded or the oil can be removed from the article and salvaged so the absorbent article can be reused.

The present invention further encompasses a method for making an absorbent article comprising the steps of: depositing on a moving forming surface a layer of hydrophobic, liquid-permeable, fibrous polymeric nonwoven web to form a first exposed outer layer; depositing on the first exposed outer layer an absorbent body comprising an oil absorbent, cellulose-based material; depositing on the absorbent body a layer of hydrophobic polymeric material to form a second exposed outer layer, the first exposed outer layer, the absorbent body, and the second exposed outer layer being deposited so that the first exposed outer layer, the absorbent body, and the second exposed outer layer form a composite web sandwich with the absorbent body disposed between the first and second exposed outer layers; bonding the absorbent body to the first and second exposed outer layers and separating the composite web from the forming surface.

Desirably, the first exposed outer layer is deposited by depositing polymeric strands as a web onto the forming surface such as by meltblowing. The second exposed outerlayer can be made in the same manner, but not necessarily in line. The absorbent body can be made by co-forming or simultaneously depositing polymeric strands, such as meltblown polymeric fibers, and wood pulp-based material to form an inner web wherein the polymeric strands and wood pulp-based material are intermixed.

Accordingly, an object of the present invention is to provide an improved absorptive article for absorbing oil from a body of water as in an oil spill.

Another object of the present invention is to provide an absorptive article which is relatively inexpensive and selectively absorbs oil over water.

Another object of the present invention is to provide an improved method for oil spill clean up.

A further object of the present invention is to provide an improved method for making absorptive articles.

Yet another object of the present invention is to absorb oil out of foods for kitchen use.

Still other objects and the broad scope of applicability of the present invention will become apparent to those of skill in the art from the details given hereafter. However, it should be understood that the detailed description of the preferred embodiments of the present invention is only given by way of illustration, because various changes and modifications well within the spirit and the scope of the invention should become apparent to those skilled in the art in view of the following detailed description.

BRIEF DESCRIPTION OF DRAWINGS

FIG. 1 is a sectional elevation view of an absorbent article made according to an embodiment of the present invention.

FIG. 2 is a perspective view of the absorbent article shown in FIG. 1.

FIG. 3 is a sectional view of the absorbent article shown in FIG. 1 illustrating the absorption of oil by the absorbent article.

FIG. 4 is a schematic illustration of a forming line for the manufacture of absorbent articles made in accordance with an embodiment of the present invention.

FIG. 7 is a perspective view of the absorbent article illustrated in FIG. 6.

FIG. 8 is a sectional end view of an absorbent article made according to still another embodiment of the present invention.

FIG. 9 is a perspective view of the absorbent article illustrated in FIG. 8.

DETAILED DESCRIPTION OF DRAWINGS

Figure 5:
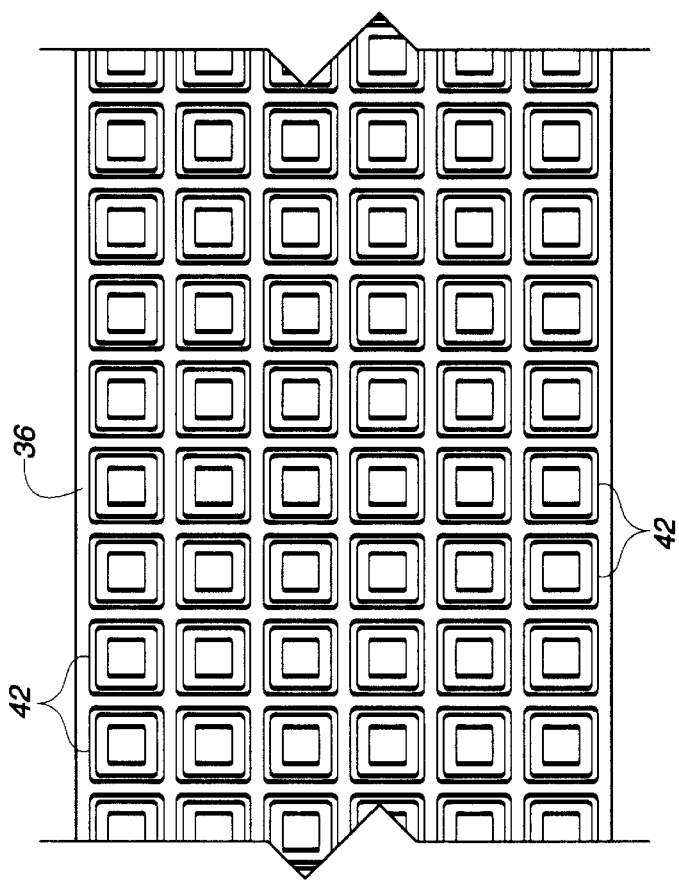
FIG. 5 is a partial plan view of a movable forming surface for use in the forming line illustrated in FIG. 4

As discussed above, the present invention provides an absorbent article particularly useful for absorbing oil floating on water such as in an oil spill on the ocean or another body of water. Several embodiments of the oil-sorbing article of this invention are described below in detail. This invention also encompasses a method for cleaning an oil spill on a body of water wherein a layer of oil rests on the surface of the body of water. Furthermore, this invention encompasses methods for making oil absorptive articles.

An oil-sorbing pad 10 made in accordance with an embodiment of this invention is illustrated in FIGS. 1 and 2 and generally comprises a first exposed outer layer 12, a second exposed outer layer 14, and an absorbent body 16 sandwiched between the outer layers. By exposed, it is meant that the first and second outer layers 12 and 14 are not covered and may directly contact the oil to be absorbed. The first and second exposed outer layers 12 and 14 are both hydrophobic, liquid-permeable, fibrous polymeric nonwoven webs and the absorbent body 16 comprises cellulose-based material and optionally, a combination of meltblown polymeric fibers and cellulose-based material. Alternatively, the second exposed outer layer 14 can be made of polymeric film such as polyethylene or polypropylene film.

More particularly, the first and second exposed outer layers 12 and 14 are meltblown or spunbond fibrous polymeric nonwoven webs. Generally, by being hydrophobic, the first and second exposed outer layers 12 and 14 tend to repel water. Desirably, the first and second exposed outer layers 12 and 14 are made from polymers having a surface energy at 20° C. less than about 50 dynes/cm². It is also desirable that the first and second exposed outer layers 12 and 14 be wettable by, or attractive to, oils such as crude oil or vegetable oil. Thus, the first and second exposed outer layers 12 and 14 desirably are made from polymers having a surface energy at 20° C. within the range between about 20 dynes/cm² and 50 dynes/cm². Even more desirably, the first and second exposed outer layers 12 and 14 are made from polymers having a surface energy at 20° C. within a range between about 20 dynes/cm² and 40 dynes/cm². Alternatively, the hydrophobicity of polymers from which the first and second exposed outer layers 12 and 14 are made can be described as follows. The liquid-air-solid contact angle of water on the polymer is greater than 90° so that there is no capillary suction of water into the fibrous polymeric web. However, the contact angle of oil on the polymers is less than 90°.

The first and second exposed outer layers 12 and 14, although hydrophobic, are porous and allow the passage of liquids such as oil. Naturally hydrophobic polymers which are suitable for forming the first and second exposed outer layers 12 and 14 include polyolefins such as polypropylene, polyethylene or polystyrene, polyesters such as polyethylene terephthalate, and polyamides such as nylon. Polypropylene is particularly desirable because of the combinations of strength, hydrophobicity and low cost. So that the first and second outer layers 12 and 14 remain hydrophobic, they are not treated with a surfactant to increase the hydrophilicity or wettability of the material.

Although the first and second exposed outer layers 12 and 14 are described as being made by meltblowing techniques, such outer layers can also be made by other conventional nonwoven web forming methods, including spunbonding and carding and bonding staple fibers. In some instances in this application, the terms polymeric strands is used and encompasses both fibers and filaments. Fibers are relatively short, discontinuous strands and filaments are strands with a substantially continuous length.

The first exposed outer layer 12 of the oil-sorbing pad 10 shown in FIGS. 1 and 2 has projections 18 which are square in cross-section and protrude outwardly from the oil-sorbing pad and away from the absorbent body 16. The projections 18 are separated by land areas 20 between the projections. The projections 18 increase the surface area of the first exposed outer layer 12 and thereby increase the rate of oil transfer through the first exposed outer layer. The projections 18 are shown as being square, but can be other shapes as well. Desirably, the projections 18 have a minimum cross-sectional dimension 22 extending between the land areas 20 from about ⅛ to 1 inch.

Alternatively, the first exposed outer layer 12 can have apertures or a combination of apertures and projections as long as the cellulosic-based material does not protrude through the aperture and wick water or saline into the absorbent body 16. For example, the first and second exposed outer layer 12 and 14 can comprise an apertured spunbond web. It may be desirable to form each of the outer layers 12 and 14 with two layers of apertured spunbond with the layers scewed so that the apertures are not aligned. Such an arrangement provides for increased surface and for oil absorption but does not allow wicking of the water or saline through the apertures.

The absorbent body 16 desirably comprises a mixture of cellulose-based materials and polymeric fibers such as meltblown fibers. However, the absorbent body 16 can be made entirely of cellulose-based material. Suitable cellulose-based material can be virgin or recycled cellulosic fibers or filaments and include wood pulp fibers, other vegetable fibers such as kenaf and cotton, rayon, and the like.

The absorbent body 16 within the oil-sorbing pad 10 has an outer periphery 24, and the first and second exposed outer layers 12 and 14 extend beyond the periphery of the absorbent body and are bonded together along the periphery of the absorbent body to form a seal 26 about the oil-sorbing pad. Accordingly, the absorbent body 16 is encased between the first and second exposed outer layers 12 and 14 so that liquid may not contact the absorbent body without first passing through the first and second outer layers 12 and 14 during oil spill clean up. The seal 26 is desirably made by ultrasonic bonding but can also be made by other means known to those skilled in the art, such as hot melt bonding, pressure bonding, heat bonding, and stitching.

The oil-sorbing pad 10 is particularly useful for cleaning oil spills. In FIG. 3, the oil-sorbing pad 10 is shown absorbing oil from a layer of oil 28 floating on the surface 30 of a body of water 32. The oil-sorbing pad 10 is oriented so that the first exposed outer layer 12 with the projections 18 contacts the layer of oil 28 and faces toward the body of water 32. Because the first and second exposed outer layers 12 and 14 of the oil-sorbing pad 10 are hydrophobic, but oil-philic, the oil-sorbing pad 10 selectively absorbs oil from the layer of oil 28 and oil droplets 29 immersed in the body of water 32, instead of water from the body of water 32. The first exposed outer layer 12 functions as a transfer layer allowing the oil to flow therethrough to the absorbent body 16 which absorbs and holds the oil. After the oil-sorbing pad is saturated with oil or the layer of oil has been entirely absorbed, the oil-sorbing pad 10 is removed from the body of water. The oil soaked oil-sorbing pad 10 can then be disposed of, combusted for fuel, or pressed to remove and salvage the oil. The oil-sorbing pad 10 can be reused after the oil is removed from the pad.

FIG. 4 illustrates a forming line 34 for forming the oil-sorbing pad 10. The forming line includes an endless forming surface 36 which travels around spaced guide rollers 38 and 40 like a conveyor belt. The forming surface 36 is best shown in FIG. 5 and includes an array of apertures 42 for forming the square projections in the first exposed outer layer 12 of the oil-sorbing pad 10.

The formation of the first and second exposed outer layers 12 and 14 and the absorbent body 16 in the forming line 34 all include meltblowing, which is a process well known to those skilled in the art. Suitable meltblowing techniques are disclosed in U.S. Pat. No. 4,041,203, the disclosure of which is incorporated herein by reference. U.S. Pat. No. 4,041,203 references the following publications on meltblowing techniques which are also incorporated herein by reference: An article entitled "*Superfine Thermoplastic Fibers*" appearing in Industrial Engineering Chemistry, Vol. 48, No. 8, pp. 1342–1346, which describes work done at the Naval Research Laboratories, in Washington, D.C.; Naval Research Laboratory Report No. 111437, dated Apr. 15, 1954; U.S. Pat. Nos. 3,715,251; 3,704,198; 3,676,242; and 3,595,245; and British Specification No. 1,217,892.

The forming line 34 includes a first meltblowing head 44 for forming a web which is the first exposed outer layer 12 of the oil-sorbing pad 10. The first meltblowing head 44 extrudes a curtain of fibers 46 which are deposited directly on the apertured forming surface 36. A vacuum 48 is disposed beneath the forming surface downstream of the first meltblowing head 44 to draw the fibers deposited by the first meltblowing head 44 into the apertures 42 in the forming surface and form the projections 18 in the first exposed outer layer 12. A suitable method for forming a nonwoven web with projections utilizing meltblowing techniques is disclosed in U.S. Pat. No. 4,741,941, the disclosure of which is expressly incorporated herein by reference.

Downstream of the first meltblowing head 44 and the vacuum 48 is a co-forming apparatus 50 for forming the absorbent body 16 of the oil-sorbing pad 10. The co-forming apparatus 50 forms the absorbent body 16 by forming a web including a mixture of meltblown polymeric fibers and wood pulp-based materials such as wood pulp fibers. Methods for such co-forming are well known to those skilled in the art and a suitable method for co-forming is disclosed in U.S. Pat. No. 4,663,220, the disclosure of which is expressly incorporated herein by reference. U.S. Pat. No. 4,011,432 also discloses co-forming technology and the disclosure of that reference is also expressly incorporated herein by reference.

The co-forming apparatus 50 produces a stream of wood pulp fibers 52. The co-forming apparatus 50 includes a conventional picker roll 54 which has a plurality of teeth 56 that are adapted to separate a matt or batt 58 of wood pulp fibers into the individual wood pulp fibers 52 forming the wood pulp stream. The matt or batt of wood pulp fibers 58 which is fed to the picker roll 54 may be a sheet of pulp fibers. The sheet of pulp fibers 58 is fed to the picker roll 54. After the teeth 56 of the picker 54 separate the sheet or matt 58 into separate wood pulp fibers 52, the individual wood pulp fibers are conveyed toward a curtain of polymeric meltblown fibers 60 extruded by a second meltblown head 62. The individual wood pulp fibers 52 are ejected from the co-forming apparatus 50 through a forming nozzle 64. A housing 66 encloses the picker roll 54 and provides a passageway or gap 68 between the surface of the picker roll 54 and the housing 66 by way of a gas duct 70. Gas is supplied through the gas duct 70 in a sufficient quantity to convey the wood pulp fibers 52 from the teeth 56 of the picker roll 54 through the forming duct or nozzle 64.

Upon merging and integration of the stream of wood pulp fibers 52 into the curtain of meltblown polymeric fibers 60, the wood pulp fibers are generally uniformly distributed throughout the curtain of meltblown fibers and a composite stream of meltblown fibers and wood pulp fibers is formed. This composite stream is deposited on top of the first exposed outer layer 12 of the oil-sorbing pad 10 formed upstream of the second meltblown head 44 to form a web which is the absorbent body 16. The wood pulp fibers 52 are entangled by the meltblown fibers 60 from the second meltblowing head 62 and are held in place in the absorbent body 16.

Downstream of the second meltblowing head 62 is an adhesive applicator 73 for applying glue on top of the absorbent body 16 and then a roll 74 of a preformed meltblown web which is deposited on top of the glue to form a web which is the second exposed outer layer 14 of the oil-sorbing pad 10 on top of the absorbent body. The three-layer oil-sorbing pad 10 composite may then be collected on a product roll 78 for later finishing by bonding the first and second exposed outer layers 12 and 14 along the periphery of the absorbent body. Alternatively, the first and second exposed outer layers 12 and 14 can be bonded in line downstream of the roll 74 by means such as ultrasonic welders, pressure bonder rollers, stitching devices, hot melt bonding devices, and the like.

Figure 6:
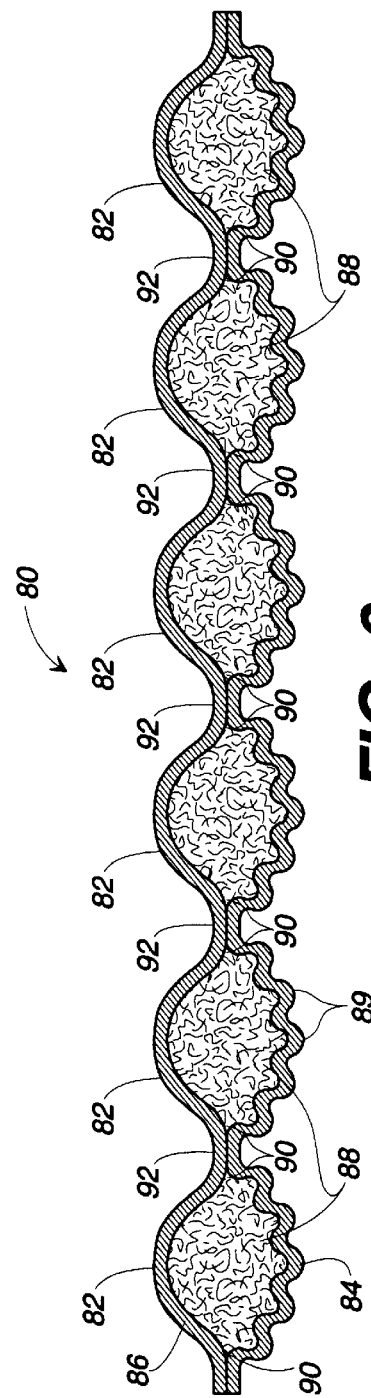
FIG. 6 is a sectional elevation view of an absorbent article made according to another embodiment of the present invention.

An oil-sorbing article 80 made according to another embodiment of this invention is illustrated in FIGS. 6 and 7 and generally comprises a plurality of parallel, discrete elongate member sections 82 including a first exposed outer layer 84, a second exposed outer layer 86, and an absorbent body 88 sandwiched between the first and second exposed outer layers. Composition of the first and second exposed outer layers 84 and 86 and the absorbent body 88 are the same as the corresponding components of the oil-sorbing pad 10 illustrated in FIGS. 1 and 2. The first exposed outer layer 84 of the oil-sorbing product 80 includes projections 89 extended outwardly from the oil-sorbing product and away from the absorbent body 88.

Each section of the absorbent body 88 corresponding to the elongate member sections 82 has a periphery 90, and the first and second exposed outer layers 84 and 86 are bonded to one another along the periphery of each elongate member section. Thus, each section of the absorbent body 88 is encased by the first and second exposed outer layers 84 and 86 within each elongate member section 82 of the oil-sorbing product 80. The oil-sorbing product 80 with the elongate member sections 82 is useful to absorb oil in an oil spill in the same manner as is the oil-sorbing product 10 described hereinabove. Desirably, the oil-sorbing product 80 is laid on top of the oil spill in long lengths and the oil-sorbing product can be conveniently cut along the bonded areas 92 between the elongate member sections 82 when desired without exposing the absorbent body inside.

Still another absorbent article 94 made according to an embodiment of this invention is illustrated in FIGS. 8 and 9 and generally comprises a plurality of connected elongate sections 96 each including an exposed outer layer 98 wrapped around an absorbent body 100 so that each elongate section is roll-shaped.

The exposed outer layer 98 and the absorbent body 100 of the absorbent article 94 have compositions corresponding to the same components of the embodiment 10 illustrated in FIGS. 1 and 2. The absorbent body 100 of each elongate member section 96 is substantially cylindrical in shape much like a roll and has opposing ends 104 and 106. The exposed outer layer 98 is wrapped around each absorbent body 100 of the corresponding elongate member section 96 and bonded along the overlapping edges 102 of the exposed outer layer 98. The elongate member sections 96 are linked end-to-end by linking portions 108 of the exposed outer layer 98 bound by closure bands 110 so that the absorbent article 94 has a structure similar to link sausage.

The embodiment 94 illustrated in FIGS. 8 and 9 is particularly useful to contain the periphery of an oil spill. Desirably, a length of the absorbent article 94 is placed about the periphery of an oil spill and contains the oil spill while absorbing oil in the same manner as described with regard to the embodiment 10 illustrated in FIGS. 1 and 2 and described above. The absorbent article 94 will float on water or saline even when saturated with oil, because oil is lighter than water, so that the absorbent article will be easy to locate and remove from the body of water once the clean up is completed.

The following examples are designed to illustrate particular embodiments of this invention and teach one of ordinary skill in the art how to carry out the invention.

EXAMPLE 1

An absorbent article in accordance with an embodiment of the present invention was made according to the process illustrated in FIG. 10 and described below.

Figure 10:
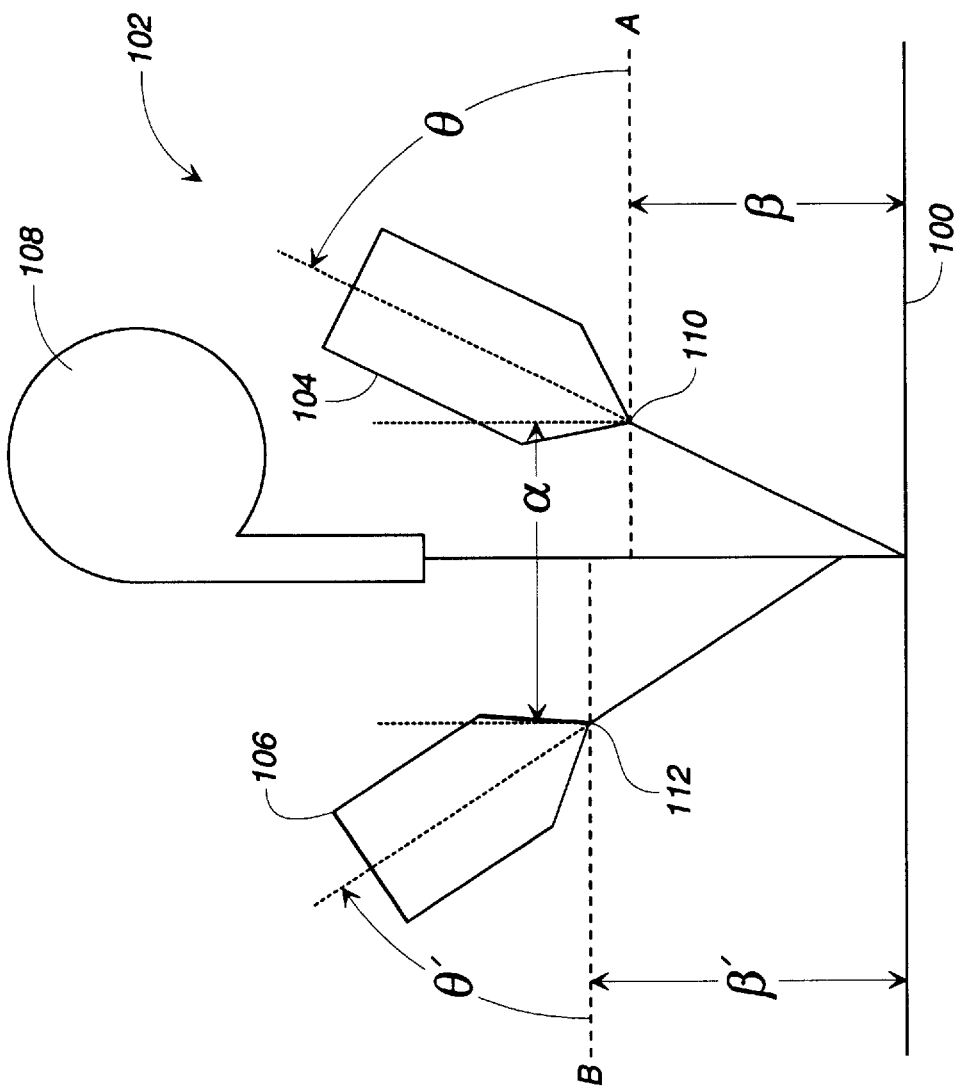
FIG. 10 is a schematic illustration of an alternative co-forming apparatus for use in making the absorbent body of an absorbent article in accordance with an embodiment of this invention.

An absorbent article comprising an exposed outer layer of meltblown polypropylene and an absorbent body including a co-formed web of wood pulp fibers and meltblown polypropylene was made by directly forming the absorbent article on a moving forming surface 100 having the same structure as the forming surface 36 illustrated in FIG. 5, with a direct forming apparatus 102 illustrated in FIG. 10. This direct forming apparatus 102 includes a first meltblowing head 104 and a second meltblowing head 106 with a conventional wood pulp fiber picker 108 having the same structure as the picker 50 illustrated in FIG. 4. The meltblowing heads 104 and 106 are mounted so that they each can be set at an angle. The angles of the meltblowing heads 104 and 106 are measured from respective planes A and B parallel to the forming surface 100. In this Example 1, the die 110 of the first meltblowing head 104 is positioned a distance β of 11½ inches from the forming surface and the die 112 of the second meltblowing head 106 is positioned a distance β' of 12½ inches from the forming surface. The dies 110 and 112 of the first and second meltblowing heads 104 and 106 are positioned a distance α of 12.5 inches from one another. With the picker 108 positioned equidistant between the two meltblowing heads the angle θ of the first die 110 is set at 55° with respect to the tangent plane A and the second die 112 is positioned at an angle θ' of 50° with respect to the tangent plane B. The first meltblowing die 110 is angled to deposit a layer of meltblown polypropylene upstream of the wood pulp fiber stream deposited by the picker 108 to produce the hydrophobic first outer layer, but there is some overlap between the polypropylene fibers deposited by the first meltblowing head and the wood pulp fibers deposited by the picker 108. The second meltblowing die 112 is positioned at an angle to produce a curtain of meltblown polypropylene fibers which intersect the wood pulp fibers deposited by the picker 108 to form the absorbent body on top of the exposed outer layer deposited by the first meltblown die 110. This type of co-forming arrangement is disclosed in U.S. Pat. No. 3,350,624, the disclosure which is expressly incorporated here by reference.

The line speed for this Example 1 is 55 feet per minute and the total basis weight of the absorbent article produced was 185.7 g/cm$^2$. The resulting absorbent article comprised a total of 65 g/cm$^2$ of polypropylene and 120.7 g/cm$^2$ of wood pulp fibers. The polypropylene extruded from both first and second meltblown heads 104 and 106 was PF-015 polypropylene available from Himont Chemical Company. For both the first and second meltblowing heads 104 and 106, the extruder melt temperature was 495° F., the die tip temperature was 500° F., and the primary air temperature was 505° F. For the first meltblowing head 104, the die tip polymer throughput was 1.125 pounds per inch per hour, the melt tip pressure was 150 psi, and the primary air pressure was 11 psi through an air gap of 0.090 inches. For the second meltblowing head 106, the die tip polymer throughput was 0.7 pounds per inch per hour, the melt tip pressure was 98 psi, and the primary air pressure was 2 psi with an air gap of 0.090 inches.

The absorbent article made in Example 1 was tested as follows:

First, water was poured on the exposed outer layer of the absorbent article and the water was not absorbed by the article. Oil was poured on the exposed outer layer of the article and it was absorbed at a rate of approximately 1 ml/cm$^2$/10 sec.

Two 6 inch squares of the absorbent article made in Example 1 were formed into two pouches by folding up the edges of the squares and tying the edges together with tape so that the exposed outer layer formed the exterior of the pouches. One pouch was placed in a beaker containing 600 milliliters of blue tinted water (via blue food coloring dye)

and 25 milliliters of corn oil, which is naturally yellow in color. The mixture was stirred intermittently. After three minutes, the pouch was removed and opened and observed to be filled with the yellow corn oil with no blue water observed inside the pouch. The 25 milliliters of oil in the beaker had been reduced to less than about 10 milliliters and all of the blue tinted water remained in the beaker. The second pouch was then placed in the beaker containing 600 milliliters of blue tinted water and the less than 10 milliliters of corn oil and stirred intermittently for three minutes. The second pouch was removed and opened and was observed to have absorbed the remainder of the corn oil. A small amount of the blue tinted water was picked up by the pouch at the edges of the pouch because the tape holding the edges had come loose and the absorbent body had been exposed to the water phase. No blue water was observed to have absorbed through the exposed outer layer of the second pouch.

EXAMPLE 2

Two pouches were made by folding up the edges of 6 inch squares of 0.8 ounce per square yard apertured polypropylene spunbond around 3 to 4 grams of wood pulp fiber and polypropylene co-form absorbent material. The exposed outer layer of polypropylene spunbond was available under the designation SNARKS® from Kimberly-Clark Corporation and the co-form material comprised 90 percent wood pulp fibers and 10 percent polypropylene meltblown fibers. Neither the exposed outer layer nor the absorbent body were treated with surfactant. One pouch was placed in a petri dish containing 75 milliliters of blue tinted water and the other pouch was placed in a petri dish containing 75 milliliters of corn oil. Immediately the pouch in the corn oil began absorbing the corn oil and picked up all of the corn oil in minutes. The pouch in the water did not pick up any water. After 50 hours the pouch in the water still remained completely dry inside and the pouch in the oil still retained all the oil and none was left in the petri dish.

EXAMPLE 3

Three oil-sorbing tubes were made:
1. 15 grams of wood pulp fiber was wrapped in two layers of 0.8 ounce per square yard apertured polypropylene spunbond available under the trademark SNARKS from Kimberly-Clark Corporation and securely taped shut along the length and ends with the wire side of the polypropylene spunbond exposed.
2. 15 grams of wood pulp fiber was wrapped in one layer of 0.8 ounce per square yard apertured polypropylene spunbond of the same type was used to make tube 1. The polypropylene spunbond was securely taped along the length and ends with the wire side of the spunbond material exposed.
3. 15 grams of wood pulp fiber was wrapped in one layer of 0.8 ounce per square yard polypropylene spunbond of the same type used to make tube 1 and was securely taped shut along its length and ends with the forming side of the polypropylene spunbond layer exposed.

The wood pulp used was CR0056 wood pulp fluff available from Kimberly-Clark Corporation.

To a 10 gallon glass aquarium tank was added 450 milliliters of SAE 10W-40 motor oil and sea water which was prepared by adding 10 liters of tap water (neutralized with STRESS COAT®) and 312.5 milliliters of sea salt (INSTANT OCEAN®). This mixture was mixed to achieve a density of the salt water of 1.023 grams per cc which is the density and salinity of sea water.

The three oil-sorbing tubes were placed in the tank of oil and sea water. After 20 minutes, over 90 percent of the oil was absorbed by the three tubes and, after 90 minutes, substantially all of the oil had been absorbed by the three tubes. Tube 1 weighed 22 grams before being placed in the tank and 354.2 grams after the test. Tube 2 weighed 18.4 grams before the test and 314.3 grams after the test. Tube 3 weighed 18.8 grams before the test and 291.8 grams after the test.

While the invention has been described in detail with respect to specific embodiments thereof, it will be appreciated that those skilled in the art, upon attaining an understanding of the foregoing, will readily conceive of alterations to, variations of and equivalents to these embodiments. Accordingly, the scope of this invention should be assessed as that of the appended claims and any equivalents thereto.

We claim:

1. Absorbent article comprising a first water repellent, oil absorbent first exposed outer layer formed from a polymer having a surface energy at 20° C. of from about 20 dynes/cm$^2$ to about 50 dynes/cm$^2$ wherein the first exposed outer layer is a fibrous polymeric nonwoven web and has an array of discrete surface features wherein the surface features include projections of the nonwoven web extending outwardly from the first exposed outer layer and away from the absorbent body permitting the article to ride lower in water during use; and
   an absorbent body, adjacent the outer layer, comprising oil absorbent, hydrophilic cellulose-based material, whereby the article is adapted to selectively absorb oil in the presence of water.

2. Absorbent article as in claim 1 further comprising a second water repellent exposed outer layer formed from a polymer having a surface energy at 20° C. of from about 20 dynes/cm$^2$, to about 50 dynes/cm$^2$ the absorbent body disposed between the first and second exposed outer layers.

3. Absorbent article as in claim 2 wherein the second exposed outer layer is a hydrophobic, liquid-permeable, fibrous polymeric nonwoven web.

4. Absorbent article as in claim 1 further comprising a second exposed outer layer comprising a polymeric film impervious to water, the absorbent body disposed between the first and second exposed outer layers.

5. Absorbent article as in claim 2 wherein the first exposed outer layer, the second exposed outer layer, and the absorbent body are in the form of sheets and form a sandwich with the absorbent body disposed between the first and second exposed outer layers.

6. Absorbent article as in claim 5 wherein the second exposed outer layer is a hydrophobic, liquid-permeable, fibrous polymeric nonwoven web.

7. Absorbent article as in claim 5 wherein the second exposed outer layer is a polymeric film.

8. Absorbent article as in claim 5 wherein the absorbent body has a periphery and the first and second exposed outer layers extend beyond the periphery of the absorbent body and are bonded together along the periphery of the absorbent body to encase the absorbent body between the first and second exposed outer layers.

9. Absorbent article as in claim 1 wherein the surface features include apertures in the nonwoven web.

10. Absorbent article as in claim 1 wherein the absorbent body further comprises polymeric strands, the polymeric strands and cellulose-based material forming a nonwoven web.

11. Absorbent article as in claim 1 wherein the fibrous polymeric nonwoven web of the first exposed outer layer comprises polyolefin strands.

12. Absorbent article as in claim 1 wherein the fibrous polymeric nonwoven web of the first exposed outer layer comprises spunbond polymeric filaments.

13. Absorbent article as in claim 1 wherein the fibrous polymeric nonwoven web of the first exposed outer layer comprises meltblown polymeric fibers.

14. Absorbent article as in claim 1 wherein the absorbent body is an elongate member having opposing ends, and the first exposed outer layer is wrapped around the absorbent body and closed at the ends of the absorbent body so that the absorbent article is roll-shaped and the absorbent body is encased in the first exposed outer layers.

15. Absorbent article as in claim 14 wherein the absorbent body is substantially cylindrical and the first exposed outer layer forms a sleeve about the absorbent body.

16. Absorbent article as in claim 3 wherein the first and second outer layers are in the form of sheets, and the absorbent body is separated into discrete sections, each section having a periphery, and the first and second exposed outer layers being bonded to one another along the periphery of each section so that each section of the absorbent body is separately encased between the first and second exposed outer layers.

17. Absorbent article as in claim 1 wherein the absorbent body is separated into discrete elongate member sections and having opposing ends and the first exposed outer layer is wrapped around the elongate member sections and held together between the elongate member sections so that the absorbent article forms a plurality of rolls connected end-to-end.

18. Absorbent article as in claim 1 wherein the cellulose-based material comprises wood pulp fibers.

19. Absorbent article comprising a first water repellent, oil absorbent first exposed outer layer formed from a polymer having a surface energy at 20° C. of from about 20 dynes/cm$^2$ to about 50 dynes/cm$^2$ wherein the first exposed outer layer is a fibrous polymeric nonwoven web and has an array of discrete surface features wherein the surface features include projections of the nonwoven web extending outwardly from the first exposed outer layer and away from the absorbent body and the surface projections have a cross-sectional area extending between adjacent land areas, the cross-sectional area of the projections having a minimal dimension from about 0.125 to about 1 inch; and an absorbent body, adjacent the outer layer, comprising oil absorbent, hydrophilic cellulose-based material, whereby the article is adapted to selectively absorb oil in the presence of water.

20. Absorbent article as in claim 19 further comprising a second water repellent exposed outer layer formed from a polymer having a surface energy at 20° C. of from about 20 dynes/cm2 to about 50 dynes/cm2, the absorbent body disposed between the first and second exposed outer layers.

21. Absorbent article as in claim 20 wherein the second exposed outer layer is a hydrophobic, liquid-permeable, fibrous polymeric nonwoven web.

22. Absorbent article as in claim 19 further comprising a second exposed outer layer comprising a polymeric film impervious to water, the absorbent body disposed between the first and second exposed outer layers.

23. Absorbent article as in claim 20 wherein the first exposed outer layer, the second exposed outer layer, and the absorbent body are in the form of sheets and form a sandwich with the absorbent body disposed between the first and second exposed outer layers.

24. Absorbent article as in claim 23 wherein the second exposed outer layer is a hydrophobic, liquid-permeable, fibrous polymeric nonwoven web.

25. Absorbent article as in claim 23 wherein the second exposed outer layer is a polymeric film.

26. Absorbent article as in claim 23 wherein the absorbent body has a periphery and the first and second exposed outer layers extend beyond the periphery of the absorbent body and are bonded together along the periphery of the absorbent body to encase the absorbent body between the first and second exposed outer layers.

27. Absorbent article as in claim 19 wherein the surface features include apertures in the nonwoven web.

28. Absorbent article as in claim 19 wherein the absorbent body further comprises polymeric strands, the polymeric strands and cellulose-based material forming a nonwoven web.

29. Absorbent article as in claim 19 wherein the fibrous polymeric nonwoven web of the first exposed outer layer comprises polyolefin strands.

30. Absorbent article as in claim 19 wherein the fibrous polymeric nonwoven web of the first exposed outer layer comprises spunbond polymeric filaments.

31. Absorbent article as in claim 19 wherein the fibrous polymeric nonwoven web of the first exposed outer layer comprises meltblown polymeric fibers.

32. Absorbent article as in claim 19 wherein the absorbent body is an elongate member having opposing ends, and the first exposed outer layer is wrapped around the absorbent body and closed at the ends of the absorbent body so that the absorbent article is roll-shaped and the absorbent body is encased in the first exposed outer layers.

33. Absorbent article as in claim 32 wherein the absorbent body is substantially cylindrical and the first exposed outer layer forms a sleeve about the absorbent body.

34. Absorbent article as in claim 21 wherein the first and second outer layers are in the form of sheets, and the absorbent body is separated into discrete sections, each section having a periphery, and the first and second exposed outer layers being bonded to one another along the periphery of each section so that each section of the absorbent body is separately encased between the first and second exposed outer layers.

35. Absorbent article as in claim 19 wherein the absorbent body is separated into discrete elongate member sections and having opposing ends and the first exposed outer layer is wrapped around the elongate member sections and held together between the elongate member sections so that the absorbent article forms a plurality of rolls connected end-to-end.

36. Absorbent article as in claim 19 wherein the cellulose-based material comprises wood pulp fibers.

* * * * *